(12) United States Patent
Chang

(10) Patent No.: US 8,402,611 B2
(45) Date of Patent: Mar. 26, 2013

(54) POSITIONING HOOK STRUCTURE FOR A HAND PULLER

(75) Inventor: Wen Cheng Chang, Changhua (TW)

(73) Assignee: Win Chance Metal Co., Ltd., Changhua (TW)

( * ) Notice: Subject to any disclaimer, the term of this patent is extended or adjusted under 35 U.S.C. 154(b) by 176 days.

(21) Appl. No.: 12/944,175

(22) Filed: Nov. 11, 2010

(65) Prior Publication Data

US 2012/0084951 A1 Apr. 12, 2012

(30) Foreign Application Priority Data

Oct. 12, 2010 (TW) .............................. 99219681 U

(51) Int. Cl.
*B25B 25/00* (2006.01)

(52) U.S. Cl. .................................................. 24/68 CD

(58) Field of Classification Search ................ 24/68 CD, 24/68 R, 68 CT, 68 B, 909, 71 ST, 265 CD; 254/222, 243, 250–252, 256, 257, 217, 218, 254/223, 237–239; 410/97, 100, 103
See application file for complete search history.

(56) References Cited

U.S. PATENT DOCUMENTS

| | | | | |
|---|---|---|---|---|
| 2,993,680 A | * | 7/1961 | Davis | 24/68 CD |
| 3,175,806 A | * | 3/1965 | Prete, Jr. | 24/68 CD |
| 3,180,623 A | * | 4/1965 | Huber | 24/68 CD |
| 4,507,829 A | * | 4/1985 | Looker | 24/68 CD |
| 4,809,953 A | * | 3/1989 | Kurita et al. | 254/250 |
| 6,457,701 B1 | * | 10/2002 | Huang | 254/217 |
| 2004/0128802 A1 | * | 7/2004 | Templeton | 24/68 CD |

* cited by examiner

*Primary Examiner* — James Brittain
(74) *Attorney, Agent, or Firm* — Alan Kamrath; Kamrath IP Lawfirm, P.A.

(57) ABSTRACT

A positioning hook structure for a hand puller contains a base including a first and a second ends. A rotating member includes a first segment axially connected with the second end and a second segment having a handle. A central shaft set is axially coupled with the first segment and the second end. Two ratchets includes teeth arranged therearound and fixed onto one end of the central shaft set. The base includes a movable retaining member to abut against one of the teeth. The rotating member includes a movable pulling rod to abut against another tooth of the ratchet. A positioning hook includes third and fourth ends, with the third end including two sides including two insertions, and with the fourth end including a hooking portion extending outward. Thus, the positioning hook inserts in the holes of the base by using the insertions.

18 Claims, 13 Drawing Sheets

POSITIONING HOOK STRUCTURE FOR A HAND PULLER

BACKGROUND OF THE INVENTION

1. Field of the Invention

The present invention relates to a hand puller to hang a fixed hook and, more particularly, to a positioning hook structure for the hand puller.

2. Description of the Prior Art

A conventional hand puller is used to position merchandise on a stack board or a platform by matching with a rope.

Referring to FIG. 13, a conventional hand puller includes a base 21, a rotating member 22, a central shaft set 23, and two ratchets 24.

The base 21 includes a first end and a second end, and the first end includes a fixing shank 211 to fix a rope.

The rotating member 22 includes a first segment and a second segment. The first segment of the rotating member 22 is axially connected with the second end of the base 21, so that the rotating member 22 rotates relative to the base 21.

The central shaft set 23 is axially coupled with the first segment of the rotating member 22 and the second end of the base 21.

Each of the two ratchets 24 includes a plurality of teeth arranged around one end of the central shaft set 23.

The base 21 includes a movable retainer 212 to abut against one of the teeth of the ratchet 24.

The rotating member 22 includes a movable pulling rod 221 to abut against another tooth of the ratchet 24, and the rotating member 22 is rotated to control the ratchets 24 to rotate the central shaft set 23.

A fixed rope assembly 25 includes a first rope 251 connecting with a first hooking member 252, and the first rope 251 is rolled around the fixing shank 211 of the base 21 to be sewn together in an overlapping manner.

A movable rope assembly 26 includes a second rope having one end to connect with a second hooking member, and another end of the second rope is fixed on the central shaft set 23. Thus, when the central shaft set 23 rotates, it rolls the second rope.

However, such a conventional hand puller still has the following defects:

1. After the fixing shank 211 is disposed on the base 21, the fixed rope assembly 25 is further provided on the base 21, and the first rope 251 of the fixed rope assembly 25 is rolled around the fixing shank 211. Thus, two ends of the first rope 251 are overlapped to be sewn together, having a high production cost.

2. After the first rope 251 of the fixed rope assembly 25 is rolled around the fixing shank 211 and two ends of the first rope 251 are overlapped to be sewn together, the sewn first rope 251 is easy to be cut due to a pulling force during operating the hand puller.

The present invention has arisen to mitigate and/or obviate the afore-described disadvantages.

SUMMARY OF THE INVENTION

The primary objective of the present invention is to provide a positioning hook structure for a hand puller including a positioning hook capable of being connected to a base by using two insertions of two sides of a third end of the positioning hook and a hooking portion of a fourth end of the positioning hook. Thus, the hand puller is fixed by way of the positioning hook without using an axial pivot, a belt, and a hooker to lower a sewing cost and a production of the axial pivot, the belt, and the hooker.

A further objective of the present invention is to provide a positioning hook structure for a hand puller coupled with a base of the hand puller by the positioning hook without applying the belt to prevent the belt from being cut by a pulling force.

Another objective of the present invention is to provide a positioning hook structure for a hand puller fixed by using the positioning hook without using the axial pivot and the belt to lower a production cost of the hand puller and prevent environmental pollution by a scrapped belt.

To obtain the above objectives, a positioning hook structure for a hand puller provided by the present invention contains:

a base including a first end and a second end, with the first end including two sides, and with the two sides of the first end including two holes formed thereon respectively and symmetrical to each other;

a rotating member including a first segment and a second segment, with the first segment of the rotating member axially connected with the second end of the base, so that the rotating member rotates relative to the base, and with the second segment of the rotating member including a handle disposed thereon;

a central shaft set axially coupled with the first segment of the rotating member and the second end of the base;

two ratchets each including a plurality of teeth arranged around a peripheral side thereof and fixed onto one end of the central shaft set;

the base including a movable retaining member to abut against one of the teeth of the ratchet, with the rotating member including a movable pulling rod to abut against another tooth of the ratchet, and with the rotating member rotated to control the ratchets to rotate the central shaft set;

a positioning hook made of a metal material and including a third end and a fourth end, with the third end of the positioning hook including two sides, with each side including an insertion, with the fourth end of the positioning hook including a hooking portion extending outward, so that the positioning hook inserts in the holes of the base by using the insertions.

DETAILED DESCRIPTION OF THE PREFERRED EMBODIMENTS

Figure 1:
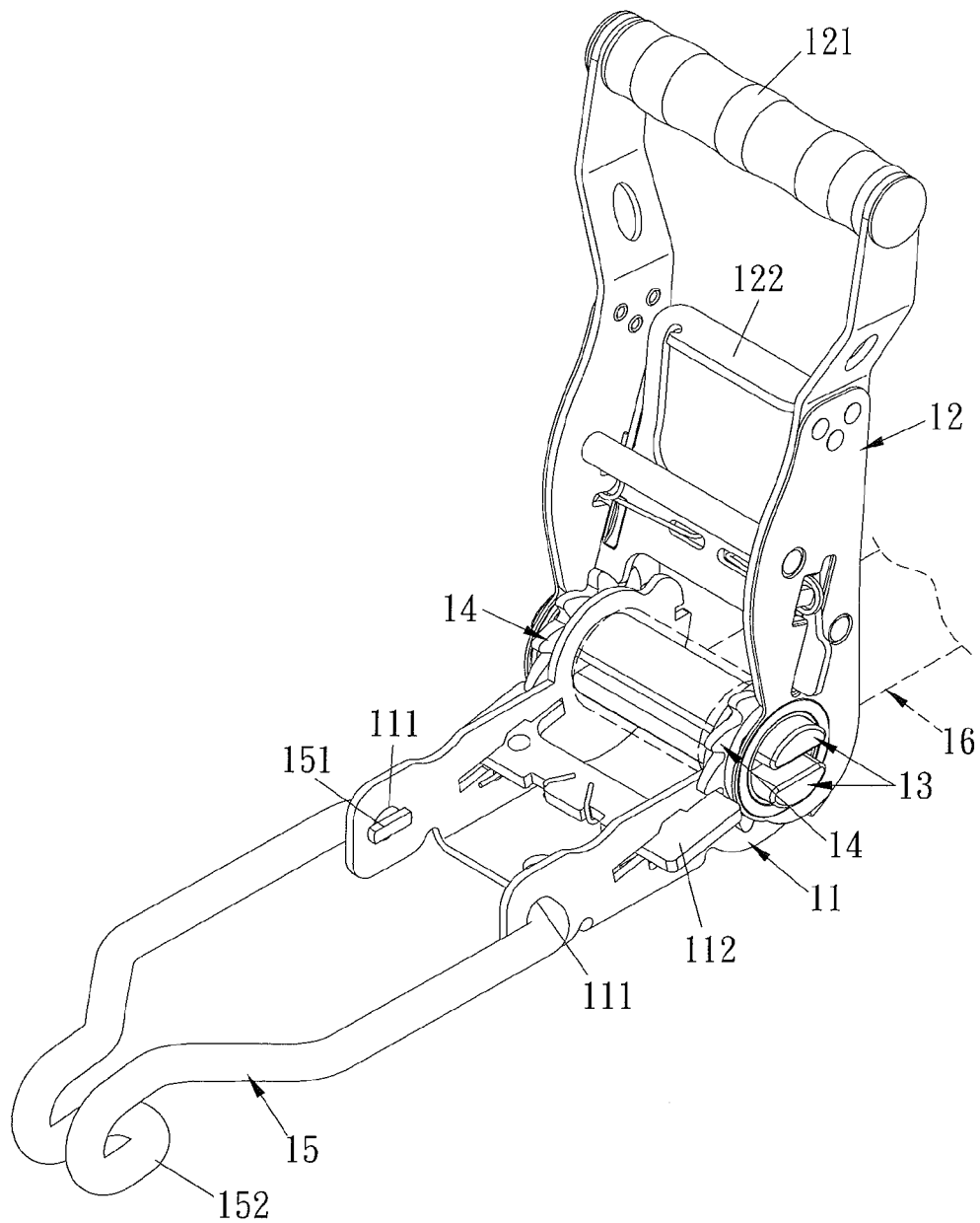
FIG. 1 is a perspective view showing the assembly of a positioning hook structure for a hand puller according to a preferred embodiment of the present invention.
Figure 2:
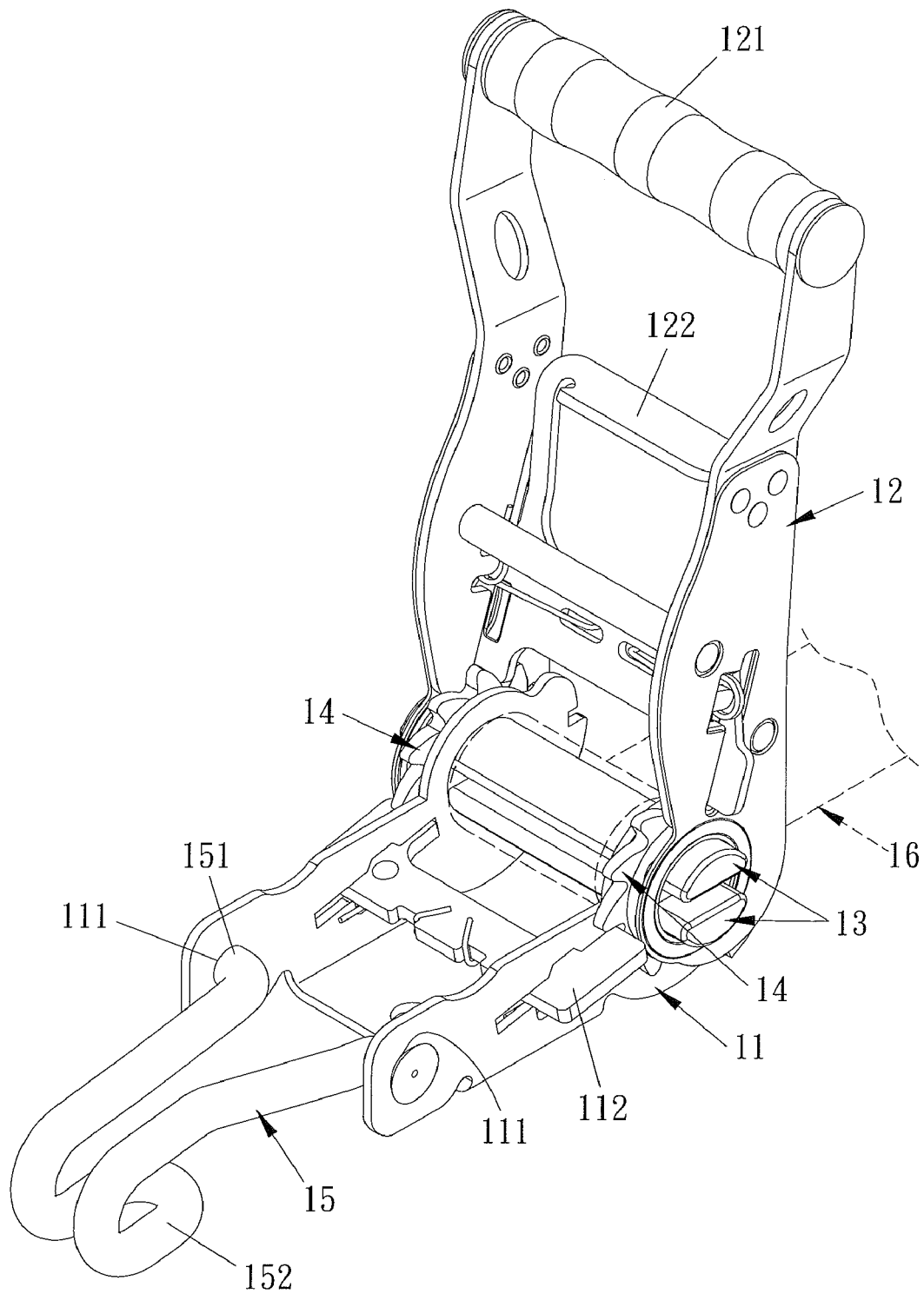
FIG. 2 is another perspective view showing the assembly of the positioning hook structure for the hand puller according to the preferred embodiment of the present invention.
Figure 3:
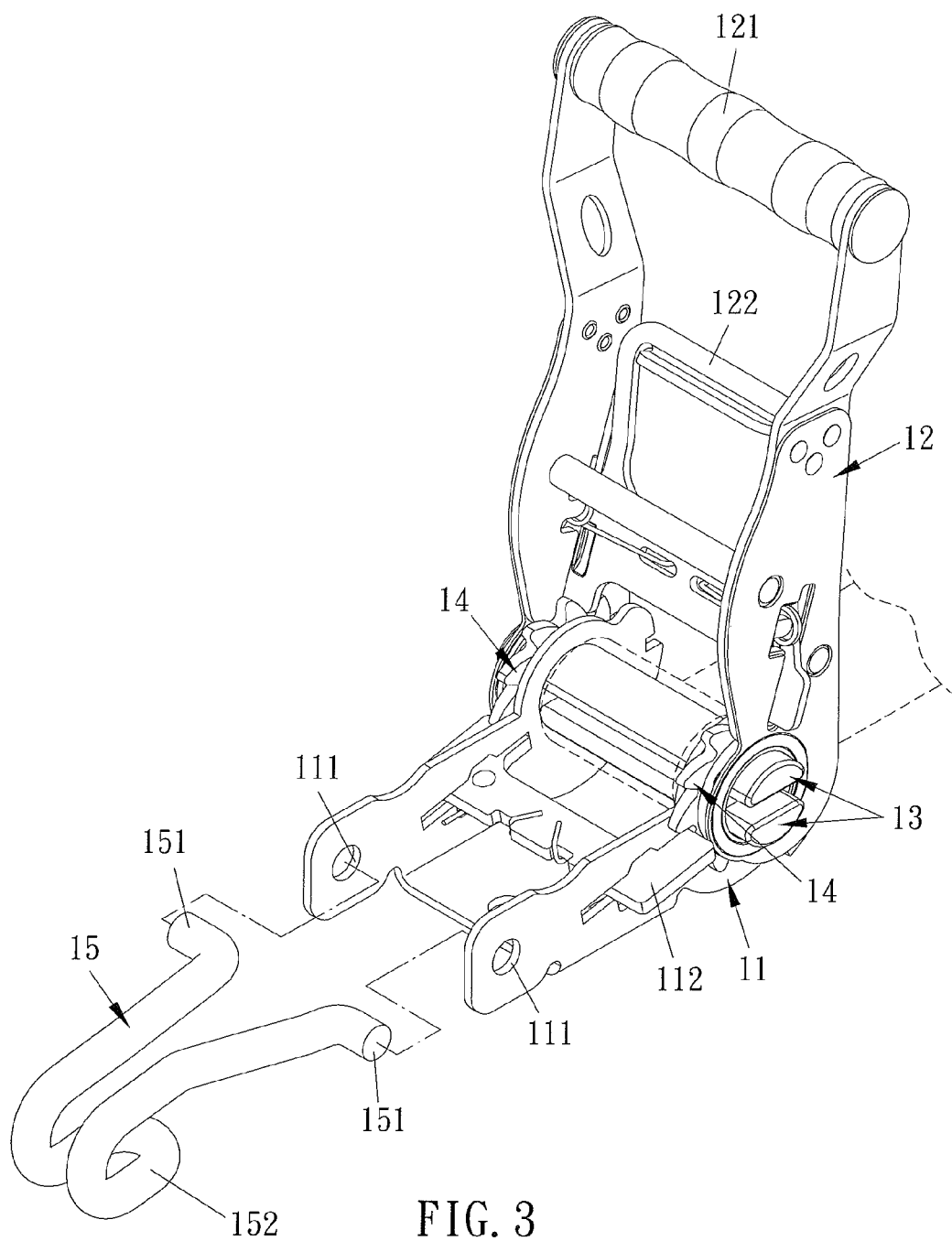
FIG. 3 is a perspective view showing the exploded components of the positioning hook structure for the hand puller according to the preferred embodiment of the present invention.

The present invention will be clearer from the following description when viewed together with the accompanying drawings, which show, for purpose of illustration only, the preferred embodiments in accordance with the present invention.

With reference to FIGS. 1-4, a positioning hook structure for a hand puller according to a preferred embodiment of the present invention comprises a base 11, a rotating member 12, a central shaft set 13, two ratchets 14, a positioning hook 15, and a movable rope assembly 16.

The base 11 includes a first end and a second end. The first end includes two sides, and the two sides of the first end include two holes 111 formed thereon respectively and symmetrical to each other.

The rotating member 12 includes a first segment and a second segment. The first segment of the rotating member 12 is axially connected with the second end of the base 11 so that the rotating member 12 rotates relative to the base 11. The second segment of the rotating member 12 includes a handle 121 disposed thereon.

The central shaft set 13 is axially coupled with the first segment of the rotating member 12 and the second end of the base 11.

Each of the two ratchets 14 includes a plurality of teeth arranged around a peripheral side thereof and to be fixed onto one end of the central shaft set 13.

The base 11 includes a movable retaining member 112 to abut against one of the teeth of the ratchet 14.

The rotating member 12 includes a movable pulling rod 122 to abut against another tooth of the ratchet 14. The rotating member 12 is rotated to control the ratchets 14 to rotate the central shaft set 13.

The positioning hook 15 is made of a metal material and integrally twist formed, press formed or weld formed. The positioning hook 15 includes a third end and a fourth end. The third end of the positioning hook 15 includes two sides, and each side includes an insertion 151 extending inward or outward. The fourth end of the positioning hook 15 includes a hooking portion 152 extending outward so that the positioning hook 15 inserts in the holes 111 of the base 11 by using the insertions 151. After inserting the insertions 151 in the holes 111, the end portions of the insertions 151 are fixed in a pressing, twisting, riveting, or locking manner.

The movable rope assembly 16 includes a rope having an end to connect with a fastening member and having another end fixed on the central shaft set 13. Thus, when the central shaft set 13 rotates, it rolls the rope.

Figure 4:
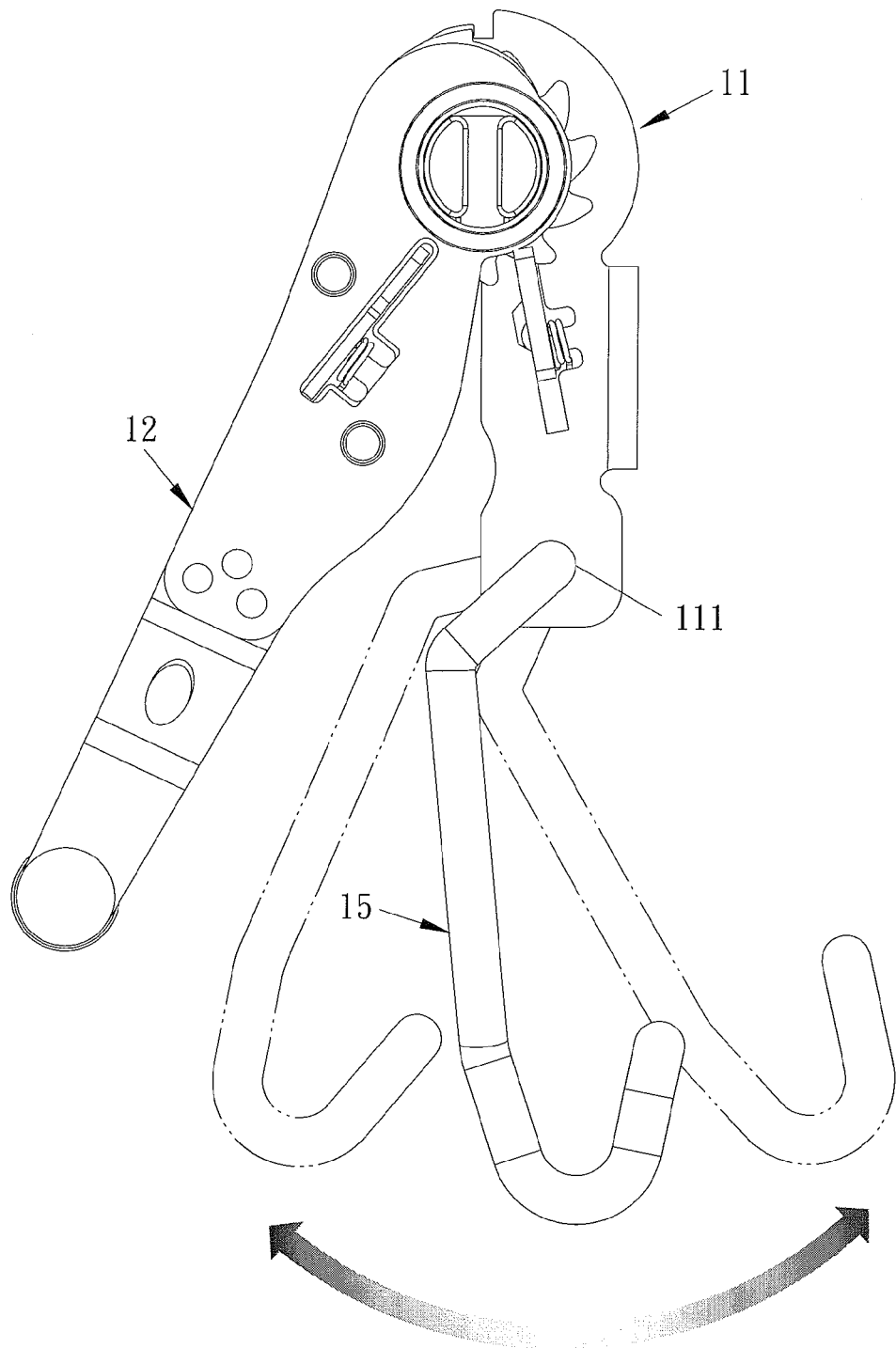
FIG. 4 is a side plan view showing the operation of the positioning hook of the positioning hook structure for the hand puller according to the preferred embodiment of the present invention.
Figure 5:
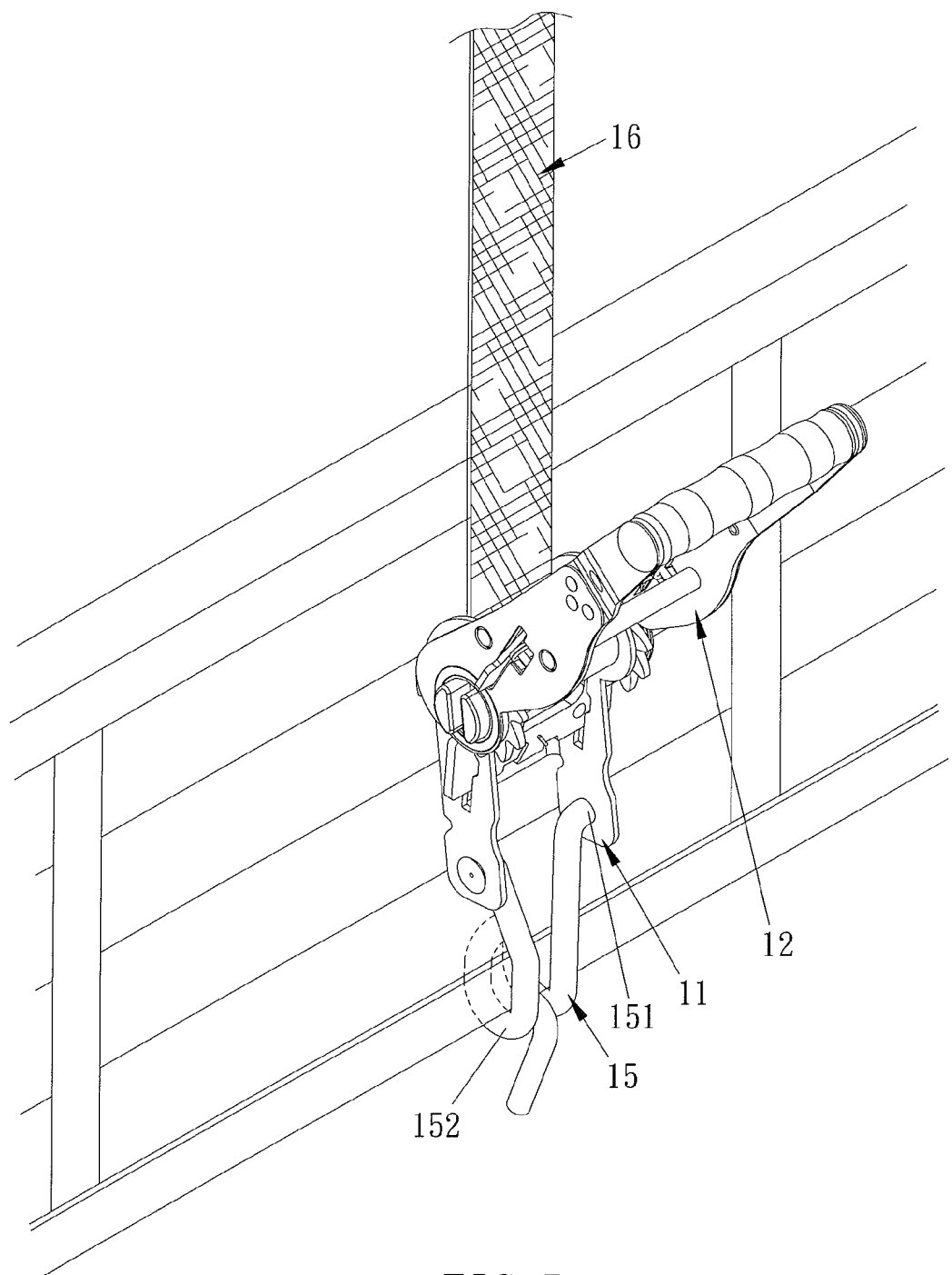
FIG. 5 is a perspective view showing the operation of the positioning hook of the positioning hook structure for the hand puller according to the preferred embodiment of the present invention.

In operation, as shown in FIGS. 4 and 5, the hand puller generates a changeable angle range by way of the positioning hook 15 of the base 11 and the holes 111 of the insertions 151. The hand puller is hung besides a truck to adjust a merchandise's positions.

Figure 6:
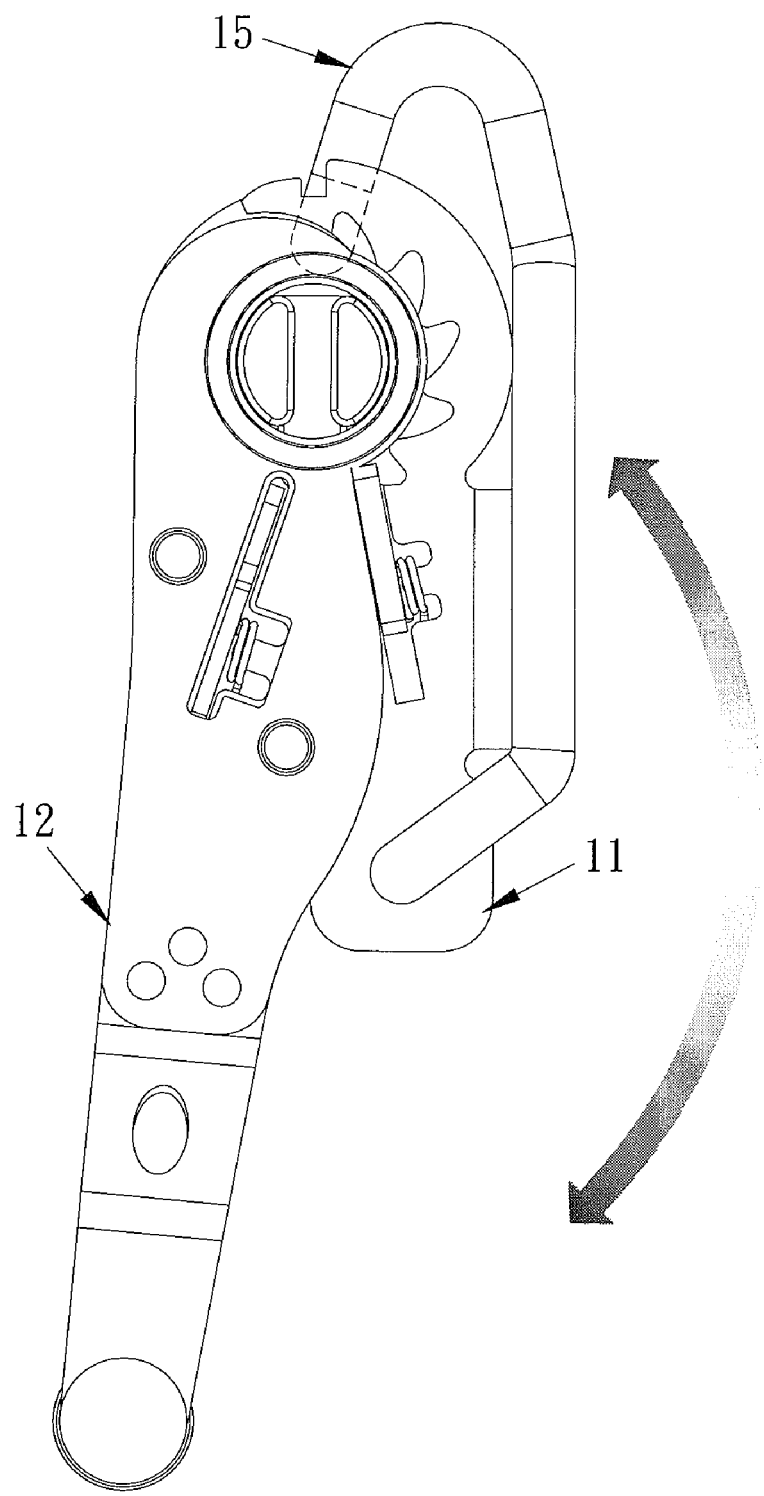
FIG. 6 is a side plan view showing the positioning hook of the positioning hook structure for the hand puller stored according to the preferred embodiment of the present invention.
Figure 7:
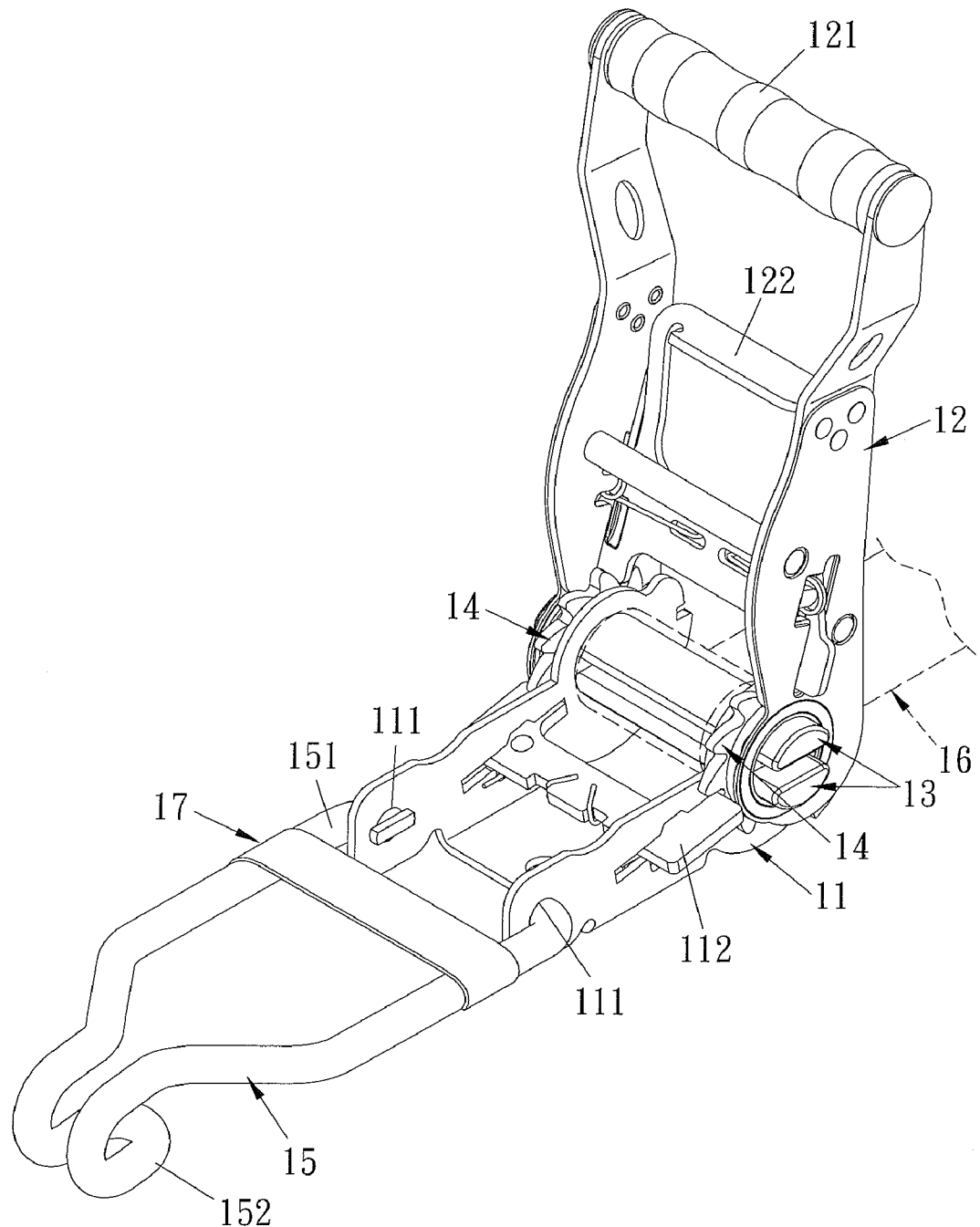
FIG. 7 is a perspective view showing the positioning hook of the positioning hook structure for the hand puller matching with a resilient retainer according to the preferred embodiment of the present invention.

Referring to FIG. 6, the base 11 connects with the positioning hook 15. Therefore, when the hand puller is not used or not in the transportation process, the hand puller is rotated to contact with the base 11 to save a volume of transportation and stock.

Figure 8:
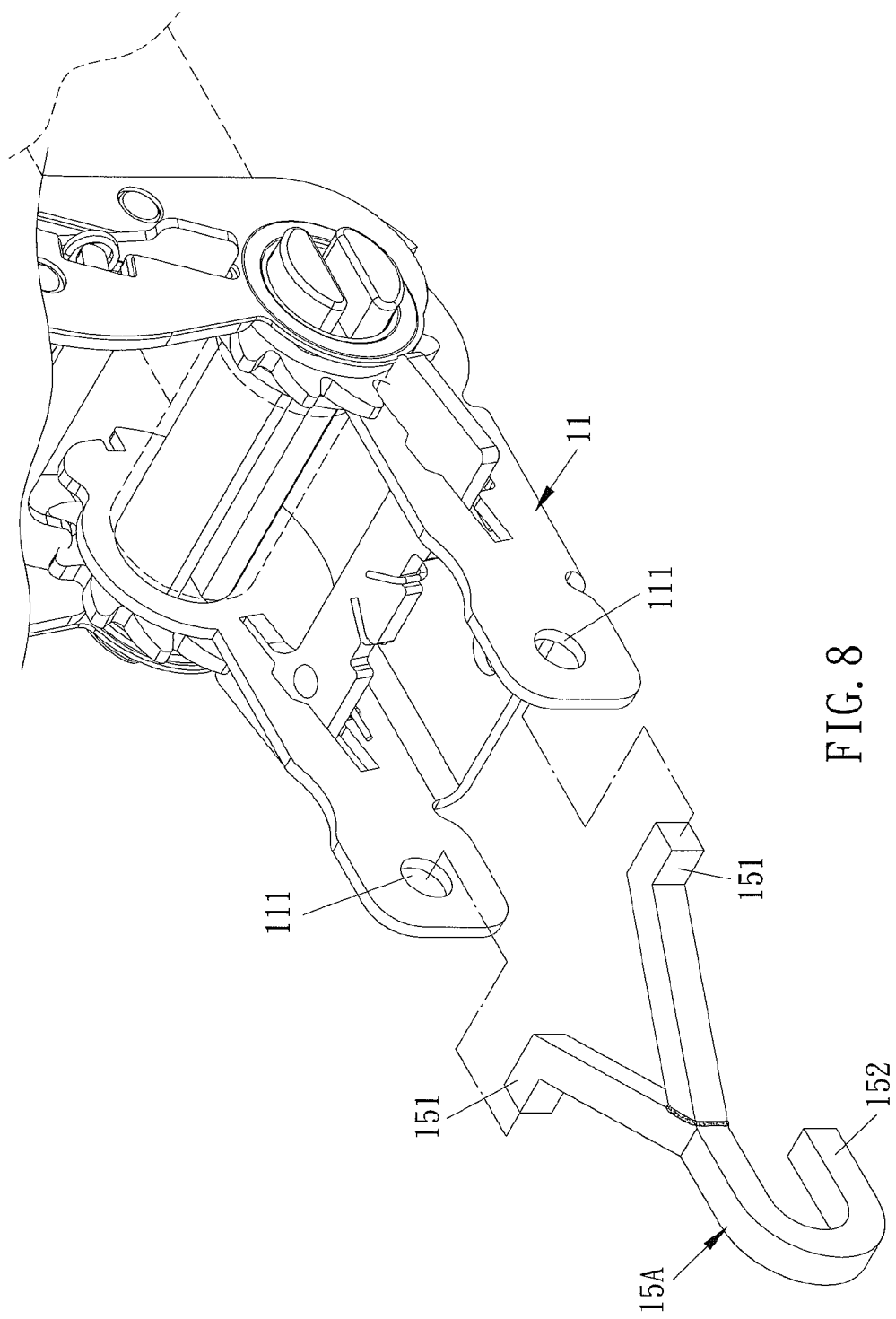
FIG. 8 is a perspective view showing the assembly of a positioning hook structure for a hand puller according to another preferred embodiment of the present invention.
Figure 9:
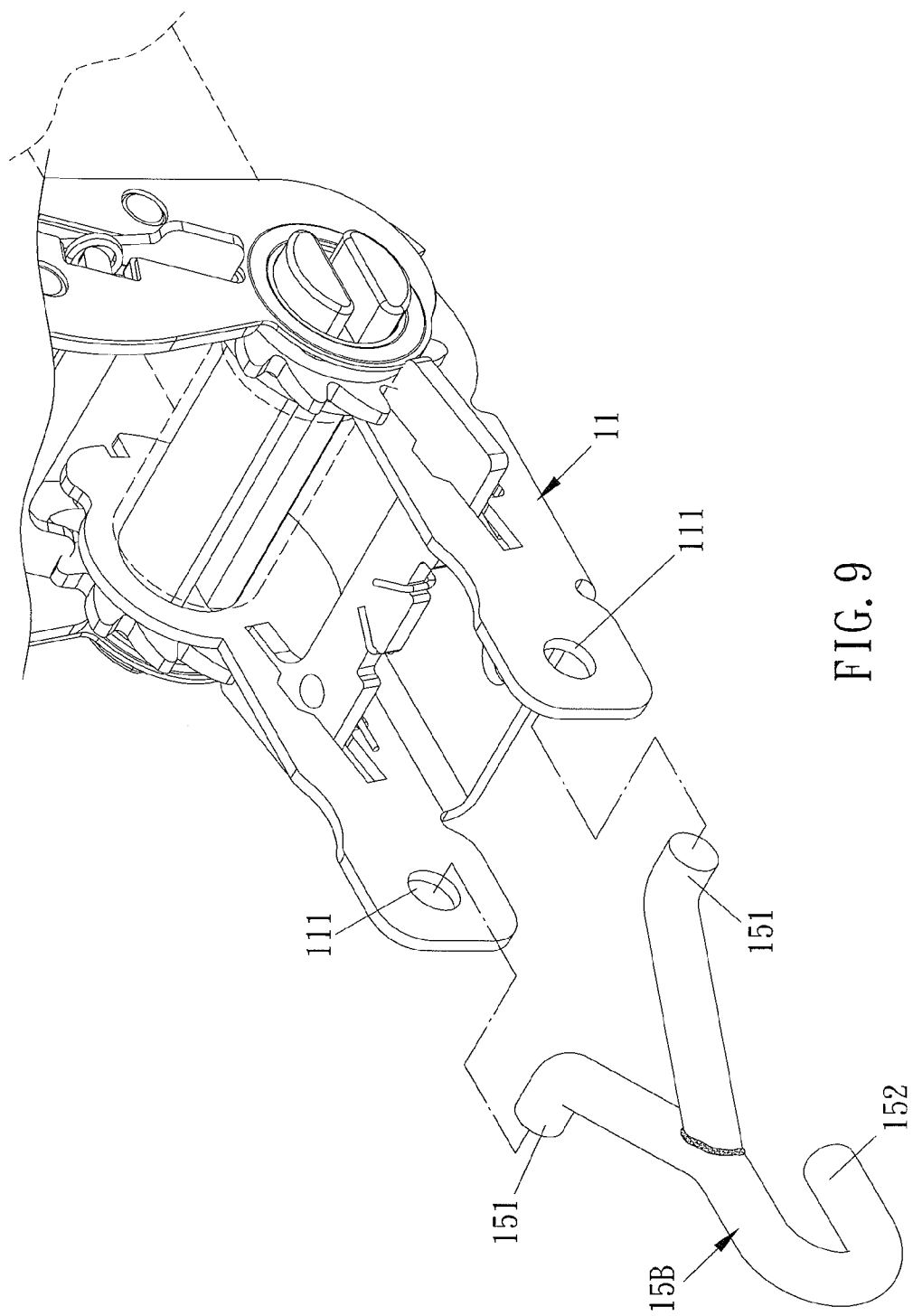
FIG. 9 is a perspective view showing the assembly of a positioning hook structure for a hand puller according to another preferred embodiment of the present invention.
Figure 10:
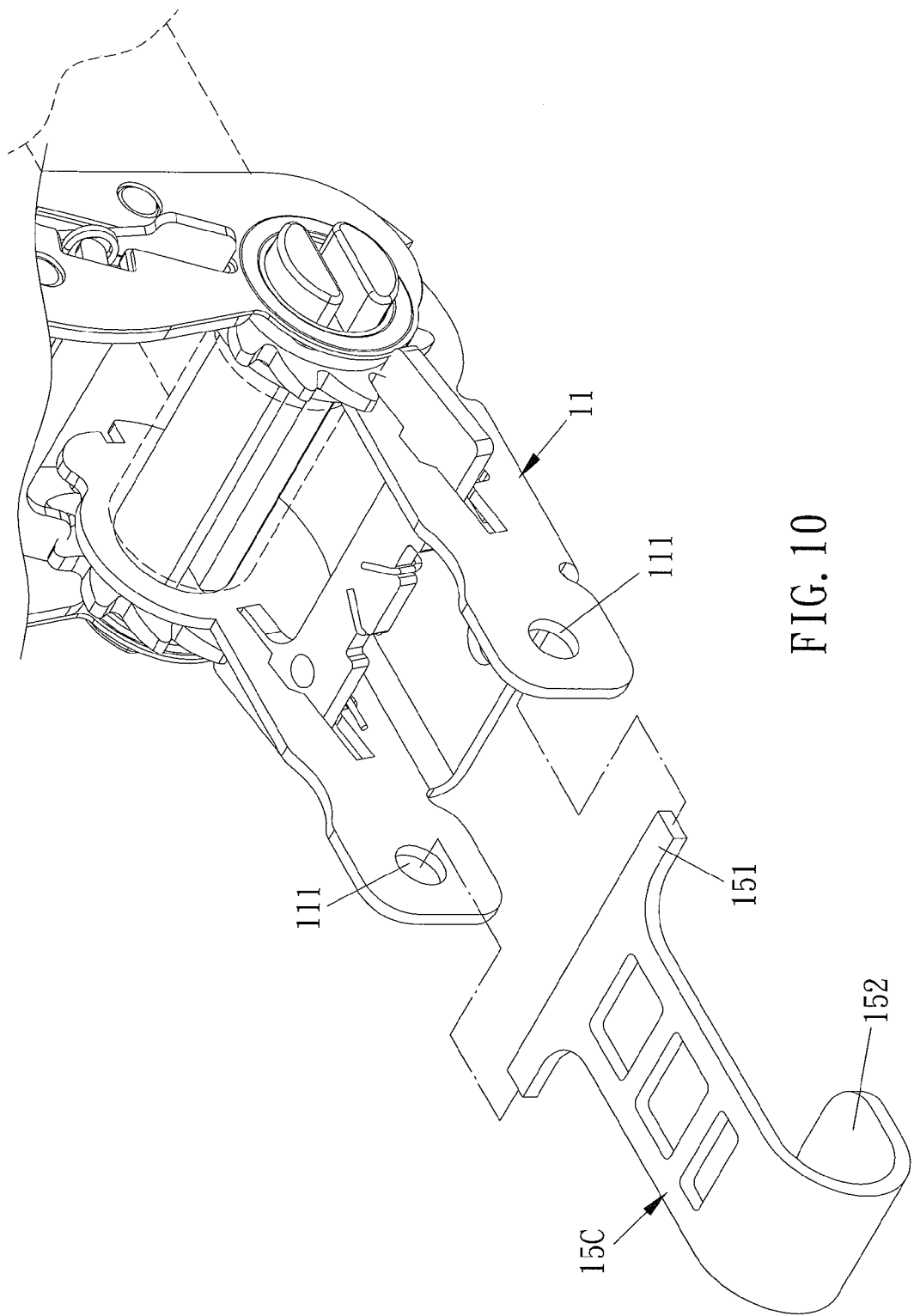
FIG. 10 is a perspective view showing the assembly of a positioning hook structure for a hand puller according to another preferred embodiment of the present invention.
Figure 11:
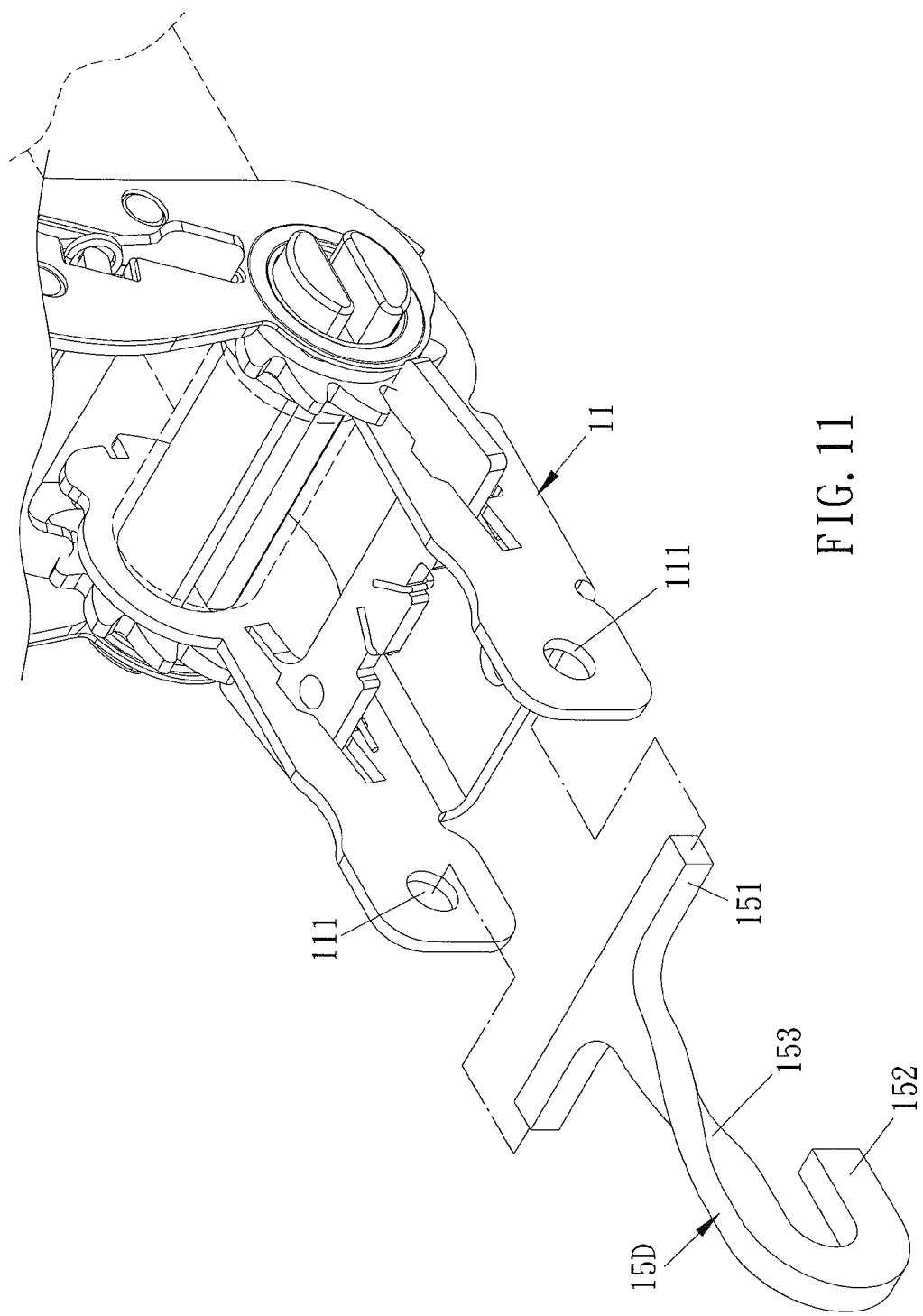
FIG. 11 is a perspective view showing the assembly of a positioning hook structure for the hand puller according to another preferred embodiment of the present invention.
Figure 12:
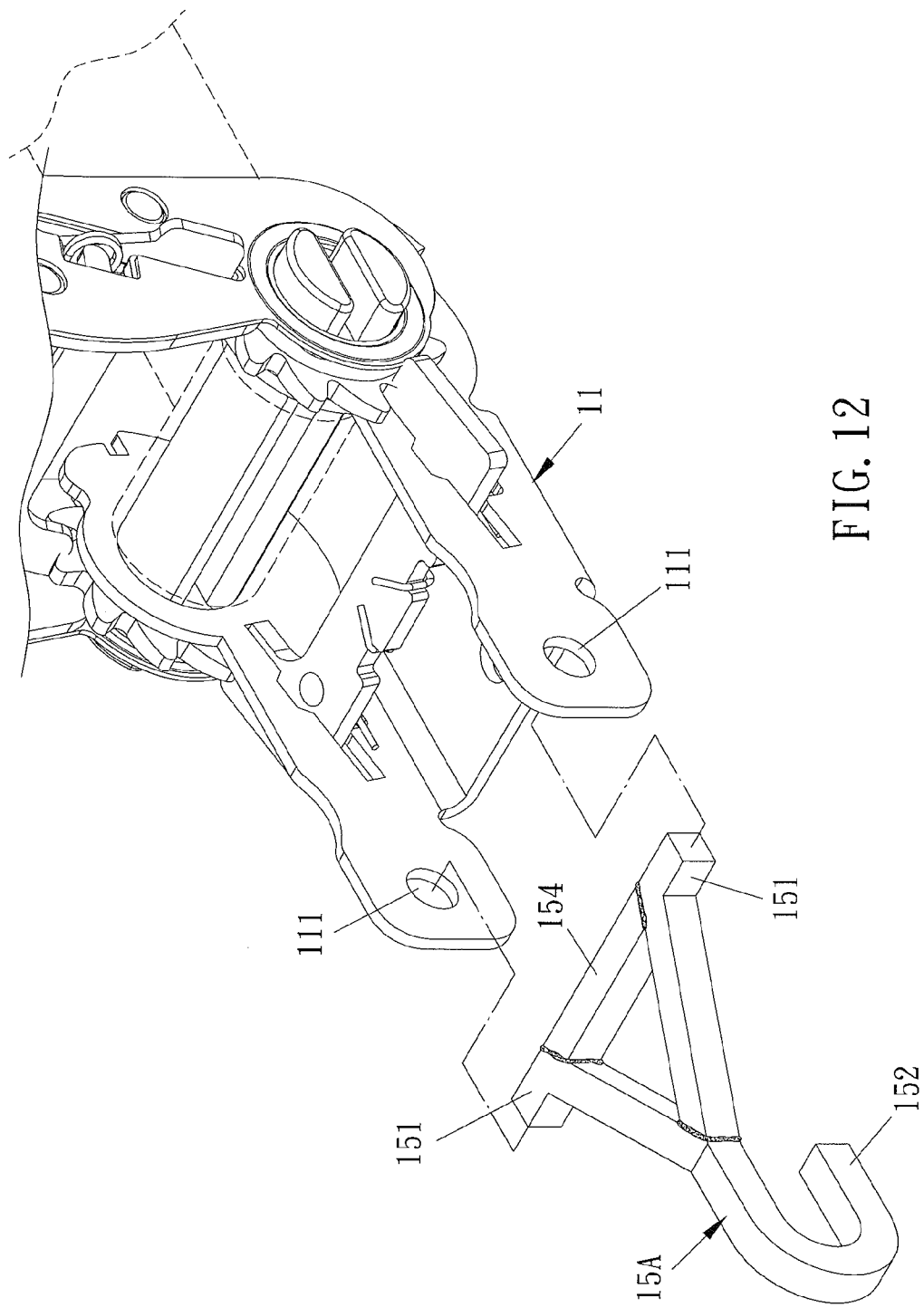
FIG. 12 is a perspective view showing the operation of a limiting stem of a positioning hook of a positioning hook structure for a hand puller according to another preferred embodiment of the present invention.
Figure 13:
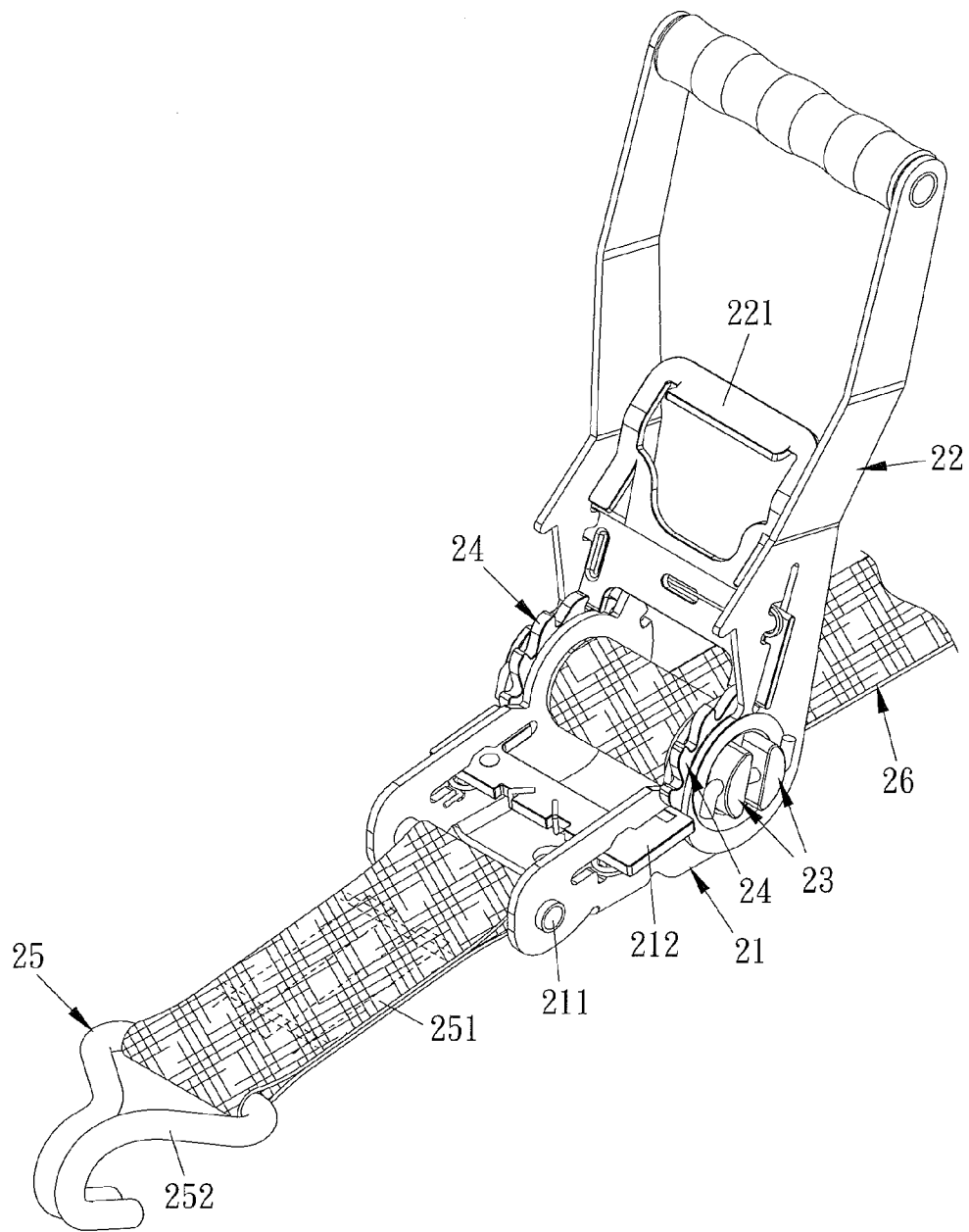
FIG. 13 is a perspective view showing the assembly of a conventional positioning hook structure for a hand puller matching with a fixed rope assembly.

As illustrated in FIGS. 1-7, a cross section of the positioning hook 15 is circular. The positioning hook 15 is made of a metal material and integrally twisted. Between two sides of the positioning hook 15 is fitted a resilient retainer 17, and two sides of the resilient retainer 17 include two buckles to match with the two sides of the metal positioning hook 15. With reference to FIG. 8, two metal bars are worked to form a semi-finished product and welded together, obtaining a positioning hook 15A, and the metal bar is a four square shape. As shown in FIG. 9, two metal bars are worked to form a semi-finished product and welded together, obtaining a positioning hook 15B, and the metal bar is circular. Referring to FIG. 10, a positioning hook 15C is made of a metal sheet and includes a number of hollow apertures formed thereon, and a hooking portion 152 is formed in a flat plate shape. With reference to FIG. 11, a positioning hook 15D is made of a metal sheet and includes a curved section 153 defined between two insertions 151 and a hooking portion 152, so that a 90-degree curve is formed between the insertions 151 and the hooking portion 152. Referring to FIG. 12, between two insertions 151 of two sides of a third end of the positioning hook 15A is defined a limiting stem 154 to prevent the insertions 151 from deformation.

While various embodiments in accordance with the present invention have been shown and described, it is clear to those skilled in the art that further embodiments may be made without departing from the scope of the present invention.

What is claimed is:

1. A positioning hook structure for a hand puller comprising:
    a base including a first end and a second end, with the first end including two sides, and with the two sides of the first end including two holes formed thereon respectively and being symmetrical to each other;
    a rotating member including a first segment and a second segment, with the first segment of the rotating member axially connected with the second end of the base, wherein the rotating member rotates relative to the base, and with the second segment of the rotating member including a handle disposed thereon;
    a central shaft set axially coupled with the first segment of the rotating member and the second end of the base;
    two ratchets each including a plurality of teeth arranged around a peripheral side thereof and fixed onto one end of the central shaft set;
    with the base including a movable retaining member to abut against one of the teeth of the two ratchets, with the rotating member including a movable pulling rod to abut against another tooth of the two ratchets, with the rotating member rotated to control the two ratchets to rotate the central shaft set; and a positioning hook including a third end and a fourth end, with the third end of the positioning hook including two sides, with each side including an insertion, with the fourth end of the positioning hook including a hooking portion extending outward, wherein the positioning hook inserts to the two holes of the base by using the insertions, with the positioning hook rotatable relative to the base about the insertions.

2. The positioning hook structure for the hand puller as claimed in claim 1, wherein the positioning hook is integrally twist formed.

3. The positioning hook structure for the hand puller as claimed in claim 1, wherein the positioning hook is integrally press formed.

4. The positioning hook structure for the hand puller as claimed in claim 1, wherein the positioning hook is integrally weld formed.

5. The positioning hook structure for the hand puller as claimed in claim 1, wherein the positioning hook is made of a metal material and integrally twisted.

6. The positioning hook structure for the hand puller as claimed in claim 1, wherein the positioning hook is made of two metal bars which are welded together.

7. The positioning hook structure for the hand puller as claimed in claim 1, wherein the positioning hook is made of a metal sheet.

8. The positioning hook structure for the hand puller as claimed in claim 7, wherein the positioning hook includes a number of hollow apertures formed thereon and the hooking portion is formed in a flat plate shape.

9. The positioning hook structure for the hand puller as claimed in claim 7, wherein the hooking portion of the positioning hook is formed in a flat plate shape, and wherein between the two insertions and the hooking portion is defined a curved section, with a 90-degree curve formed between the insertions and the hooking portion.

10. The positioning hook structure for the hand puller as claimed in claim 1, wherein the insertions extend inward.

11. The positioning hook structure for the hand puller as claimed in claim 1, wherein the insertions extend outward.

12. The positioning hook structure for the hand puller as claimed in claim 1, wherein the positioning hook includes a number of hollow apertures formed thereon and the hooking portion is formed in a flat plate shape.

13. The positioning hook structure for the hand puller as claimed in claim 1, wherein the hooking portion of the positioning hook is formed in a flat plate shape, and wherein between the two insertions and the hooking portion is defined a curved section, with a 90-degree curve formed between the insertions and the hooking portion.

14. The positioning hook structure for the hand puller as claimed in claim 1, wherein between the two insertions of the two sides of the third end of the positioning hook is defined a limiting stem to prevent deformation of the insertions.

15. The positioning hook structure for the hand puller as claimed in claim 1 further comprising a movable rope assembly including a rope having an end to connect with a fastening member and having another end fixed on the central shaft set, wherein when the central shaft set rotates, the central shaft set rolls the rope.

16. The positioning hook structure for the hand puller as claimed in claim 1, wherein after the insertions insert in the two holes, end portions of the insertions are fixed by selecting from a pressing, a twisting, a riveting, and a locking manner.

17. A positioning hook structure for a hand puller comprising:
a base including a first end and a second end, with the first end including two sides, and with the two sides of the first end including two holes formed thereon respectively and being symmetrical to each other;
a rotating member including a first segment and a second segment, with the first segment of the rotating member axially connected with the second end of the base, wherein the rotating member rotates relative to the base, and with the second segment of the rotating member including a handle disposed thereon;
a central shaft set axially coupled with the first segment of the rotating member and the second end of the base;
two ratchets each including a plurality of teeth arranged around a peripheral side thereof and fixed onto one end of the central shaft set;
with the base including a movable retaining member to abut against one of the teeth of the two ratchets, with the rotating member including a movable pulling rod to abut against another tooth of the two ratchets, with the rotating member rotated to control the two ratchets to rotate the central shaft set; and
a positioning hook including a third end and a fourth end, with the third end of the positioning hook including two sides, with each side including an insertion, with the fourth end of the positioning hook including a hooking portion extending outward, wherein the positioning hook inserts to the two holes of the base by using the insertions, wherein the positioning hook is made of a metal material and integrally twisted, wherein between the two sides of the positioning hook is fitted a resilient retainer, and wherein two sides of the resilient retainer include two buckles to match with the two sides of the metal positioning hook individually.

18. A positioning hook structure for a hand puller comprising:
a base including a first end and a second end, with the first end including two sides, and with the two sides of the first end including two holes formed thereon respectively and being symmetrical to each other;
a rotating member including a first segment and a second segment, the first segment of the rotating member axially connected with the second end of the base, wherein the rotating member rotates relative to the base, and with the second segment of the rotating member including a handle disposed thereon;
a central shaft set axially coupled with the second end of the base;
two ratchets each including a plurality of teeth arranged around a peripheral side thereof and fixed onto one end of the central shaft set;
with the base including a movable retaining member to abut against one of the teeth of the two ratchets, with the rotating member including a movable pulling rod to abut against another tooth of the two ratchets, with the rotating member rotated to control the ratchets to rotate the central shaft set; and
a positioning hook including a third end and a fourth end, with the third end of the positioning hook including two sides, with each side including an insertion, with the fourth end of the positioning hook including a hooking portion extending outward, wherein the positioning hook inserts to the holes of the base by using the insertions, with the positioning hook rotatable relative to the base about the insertions.

* * * * *